United States Patent
Hsueh et al.

(10) Patent No.: US 11,658,341 B2
(45) Date of Patent: May 23, 2023

(54) GEL-STATE ELECTROLYTE BATTERY, GEL-STATE FLAME-RETARDANT ELECTROLYTE FILM AND MANUFACTURING METHODS THEREOF

(71) Applicant: Institute of Nuclear Energy Research, Atomic Energy Council, Executive Yuan, R.O.C, Taoyuan (TW)

(72) Inventors: Tien-Hsiang Hsueh, Taoyuan (TW); Shang-En Liu, Taoyuan (TW); Min-Chuan Wang, Taoyuan (TW); Bo-Hsien Wu, Taoyuan (TW); Shu-Mei Chang, Taoyuan (TW)

(73) Assignee: INSTITUTE OF NUCLEAR ENERGY RESEARCH, ATOMIC ENERGY COUNCIL, EXECUTIVE YUAN, R.O.C, Taoyuan (TW)

( * ) Notice: Subject to any disclaimer, the term of this patent is extended or adjusted under 35 U.S.C. 154(b) by 445 days.

(21) Appl. No.: 16/921,062

(22) Filed: Jul. 6, 2020

(65) Prior Publication Data

US 2021/0359341 A1   Nov. 18, 2021

(30) Foreign Application Priority Data

May 14, 2020   (TW) .................................. 109116083

(51) Int. Cl.
*H01M 10/0565*   (2010.01)
*H01M 10/0567*   (2010.01)
*H01M 10/0525*   (2010.01)
*H01M 10/058*   (2010.01)
*H01M 10/42*   (2006.01)

(52) U.S. Cl.
CPC ..... *H01M 10/0565* (2013.01); *H01M 10/058* (2013.01); *H01M 10/0525* (2013.01); *H01M 10/0567* (2013.01); *H01M 10/4235* (2013.01); *H01M 2300/0082* (2013.01); *H01M 2300/0085* (2013.01)

(58) Field of Classification Search
CPC ......... H01M 10/0565; H01M 10/0525; H01M 10/0567; H01M 10/058; H01M 10/4235; H01M 2300/0082; H01M 2300/0085
See application file for complete search history.

(56) References Cited

FOREIGN PATENT DOCUMENTS

JP   2001229975 A   *   8/2001

OTHER PUBLICATIONS

JP2001229975A. Aug. 24, 2001. English machine translation by EPO. (Year: 2001).*

* cited by examiner

*Primary Examiner* — James Lee
(74) *Attorney, Agent, or Firm* — Locke Lord LLP; Tim Tingkang Xia, Esq.

(57) ABSTRACT

A method for manufacturing a gel-state flame-retardant electrolyte film includes the steps of: preparing a first solution having a high boiling-point solvent; adding a solid-state polymer material into the first solution, and performing a heating and stirring process to form a second solution; adding a flame-retardant electrolyte material and a flame-retardant water-absorbent material into the second solution for forming a third solution by well mixing; forming the third solution into a viscous matter; and, solidifying the viscous matter to form the gel-state flame-retardant electrolyte film. In addition, a gel-state flame-retardant electrolyte film, a gel-state electrolyte battery and a method for manufacturing the gel-state electrolyte battery are also provided.

22 Claims, 4 Drawing Sheets

GEL-STATE ELECTROLYTE BATTERY, GEL-STATE FLAME-RETARDANT ELECTROLYTE FILM AND MANUFACTURING METHODS THEREOF

CROSS REFERENCE TO RELATED APPLICATION

This application claims the benefits of Taiwan application Serial No. 109116083, filed on May 14, 2020, the disclosures of which are incorporated by references herein in its entirety.

TECHNICAL FIELD

The present disclosure relates in general to a thin film battery, an electrolyte film and manufacturing methods thereof, and more particularly to a gel-state electrolyte battery, a gel-state flame-retardant electrolyte film and manufacturing methods thereof.

BACKGROUND

With advancement of technology and discovery of new materials, versatile types of batteries have been developed. In addition, with emerging of portable appliances such as mobile phones and notebook computers, a demand in high-performance and miniaturized batteries has become stronger. To satisfy this need, a lithium-ion battery featured in high energy density and convenient charge-ability gradually attracts people's attention, and actually has been widely used.

In electrochemical components such as primary or secondary batteries and capacitors, liquid electrolytes are usually adopted as conductive materials for producing new batteries. However, the liquid electrolytes do have a risk of liquid leakage, a shortcoming of less stability, and poor performances in corrosion, flammability, safety and reliability. Thus, the liquid electrolytes can't fully meet safety requirements in large-scale industrial energy storage. Unfortunately, some manufacturers' quick improvements do lead to bad batteries that cause a serial unforgivable explosion of mobile devices.

In addition, since the rise of new energy vehicles, news of spontaneous explosion of lithium batteries has not been terminated. Hence, huge efforts from enterprises and research institutes have been devoted to and do urge to provide improvements upon problems encountered in the lithium battery industry chain.

Further, current methods for preparing solid-state polymer electrolytes such as porous membrane wetting or cross-linking are usually complicated. Also, in assembling a battery, tedious steps such as soaking films in electrolyte liquids, heating precursors and photo-polymerization are involved, but from which accompanying quality control becomes an important issue.

SUMMARY

An object of the present disclosure is to provide an innovative method for manufacturing a gel-state electrolyte battery which could be assembled under a natural indoor environment and/or a gel-state flame-retardant electrolyte film.

In one embodiment of this disclosure, a method for manufacturing a gel-state flame-retardant electrolyte film includes the steps of: (a) preparing a first solution having a high boiling-point solvent; (b) adding a solid-state polymer material into the first solution, and performing a heating and stirring process to form a second solution; (c) adding a flame-retardant electrolyte material and a flame-retardant water-absorbent material into the second solution for forming a third solution by well mixing; (d) forming the third solution into a viscous matter; and, (e) solidifying the viscous matter to form the gel-state flame-retardant electrolyte film.

In another embodiment of this disclosure, a gel-state flame-retardant electrolyte film is produced by the method for manufacturing the gel-state flame-retardant electrolyte film.

In a further embodiment of this disclosure, a method for manufacturing a gel-state electrolyte battery includes the steps of: (1) coating (e.g. thermal evaporating or attaching) a high reactive metal onto a cathode to form thereon a reactive metal-rich layer; (2) preparing a gel-state flame-retardant electrolyte film; and, (3) performing a lamination process to laminate respectively the cathode and an anode to two opposite surfaces of the gel-state flame-retardant electrolyte film, so that the reactive metal-rich layer is disposed between the gel-state flame-retardant electrolyte film and the cathode. The step (2) includes the steps of: (21) preparing a first solution having a high boiling-point solvent; (22) adding a solid-state polymer material into the first solution, and performing a heating and stirring process to form a second solution; (23) adding a flame-retardant electrolyte material and a flame-retardant water-absorbent material into the second solution for forming a third solution by well mixing; (24) forming the third solution into a viscous matter; and, (25) solidifying the viscous matter to form the gel-state flame-retardant electrolyte film.

In one more embodiment of this disclosure, a gel-state electrolyte battery, manufactured by the method for manufacturing the gel-state electrolyte battery, includes the gel-state flame-retardant electrolyte film, the cathode, the anode and the reactive metal-rich layer. The cathode and the anode are laminated onto two opposite surfaces of the gel-state flame-retardant electrolyte film, respectively. The reactive metal-rich layer is disposed between the gel-state flame-retardant electrolyte film and the cathode.

In one embodiment of the disclosure, the aforesaid step (a) or (21) includes the steps of: adopting a solvent having a boiling point over 200° C. at one atmospheric pressure as the high boiling-point solvent; adopting a lithium-salt solid or solution as a lithium-salt material; and, heating and well mixing the high boiling-point solvent and the lithium-salt material at a temperature ranging from 20° C. to 150° C.

In one embodiment of the disclosure, the aforesaid step (b) or (22) includes a step of having the solid-state polymer material to share 6~40 wt % of the second solution and to have a weight equal to 20~60% weight of the high boiling-point solvent. The sulfur-containing high boiling-point solvent has a weight equal to 50%~100% weight of the high boiling-point solvent. The melting point of the sulfur-containing high-boiling point solvent under an atmospheric pressure is greater than 25° C., and the boiling point is greater than 250° C.

In one embodiment of the disclosure, the aforesaid step (b) or (22) includes the steps of: adopting a solvent having a boiling temperature below 100° C. at one atmospheric pressure as a low boiling-point co-solvent; performing the heating and stirring process to well mix the solid-state polymer material and the low boiling-point co-solvent so as to form a pre-solution having the low boiling-point co-solvent; and, adding the pre-solution into the first solution, and then well mixing the pre-solution and the first solution so as to form the second solution.

In one embodiment of the disclosure, the aforesaid step of adding the pre-solution into the first solution and then well mixing the pre-solution and the first solution so as to form the second solution includes a step of having the solid-state polymer material to share 6~40 wt % of the second solution and to have a weight equal to 20~60% weight of the high boiling-point solvent, and having the low boiling-point co-solvent to share 1~80 wt % of the second solution.

In one embodiment of the disclosure, the aforesaid step (c) or (23) includes the steps of: adopting a material able to increase electrolyte ion conductivity as the flame-retardant electrolyte material having a grain size ranging from 10 nm to 1 μm; adopting the flame-retardant water-absorbent material having a water absorption greater than 0.1 g/g and a grain size ranging from 1 nm to 1 μm; and, having the flame-retardant electrolyte material to share 1~90 wt % of the third solution and the flame-retardant water-absorbent material to share 0.01~20 wt % of the third solution.

In one embodiment of the disclosure, the aforesaid (d) or (24) includes a step of heating and stirring the third solution to form the viscous matter having a viscosity greater than 200 cps above 25° C.

In one embodiment of the disclosure, the aforesaid step (e) or (25) includes a step of cooling down the viscous matter and removing the low boiling-point co-solvent.

In one embodiment of the disclosure, the aforesaid step (e) or (25) includes a step of applying atmospheric plasma spraying or aerosol spraying to a surface of the viscous matter so as to form the gel-state flame-retardant electrolyte film by solidification.

In one embodiment of the disclosure, the high reactive metal in the aforesaid step (1) includes a lithium, a sodium or a magnesium.

In one embodiment of the disclosure, prior to the aforesaid step (25), a step of painting the viscous matter onto the reactive metal-rich layer is further included.

In one embodiment of the disclosure, the aforesaid method for manufacturing the gel-state electrolyte battery further includes a step of applying wet coating, atmospheric plasma spraying, aerosol spraying or plasma sputtering to produce the cathode and the anode.

As stated above, in the gel-state electrolyte battery, the gel-state flame-retardant electrolyte film and the manufacturing methods thereof provided by this disclosure, the gel-state flame-retardant electrolyte film contains the flame-retardant water-absorbent material for absorbing and restricting a tiny amount of water inside the gel-state flame-retardant electrolyte film, the cathode or the anode. Since the water can reject the flame, thus frame retarding, before or after the water is absorbed, can be formed to enhance electrochemical efficiency of the gel-state electrolyte battery.

Further, in the methods for manufacturing the gel-state electrolyte battery and the gel-state flame-retardant electrolyte film, the low boiling-point co-solvent to help dissolution is introduced to reduce the process temperature for manufacturing the gel-state flame-retardant electrolyte film; for example, to reduce the process temperature to a temperature less than 100° C. or evenly equal to the room temperature.

In addition, the gel-state electrolyte battery of this disclosure contains a reactive metal-rich layer such as a lithium-rich layer, a sodium-rich layer or a magnesium-rich layer. By coating (e.g. thermal evaporating or attaching) the high reactive metal with high chemical reactivity, the high reactive metal would react with and then be discharged into the cathode or anode material, and thus the interfaces connecting the respective gel-state electrolytes to the cathode and the anode would be able to supply enough metal or metallic ions. Thereupon, possible concentration polarization occurring at the interfaces between the gel-state electrolyte and any of the cathode or anode material would be reduced, and the capacitance of the battery structure can be thus enhanced.

Furthermore, the gel-state flame-retardant electrolyte film of this disclosure can be provided with nano-projection surfaces, wettability, plasticity and flexibility, and thus good for well serving part of the battery.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
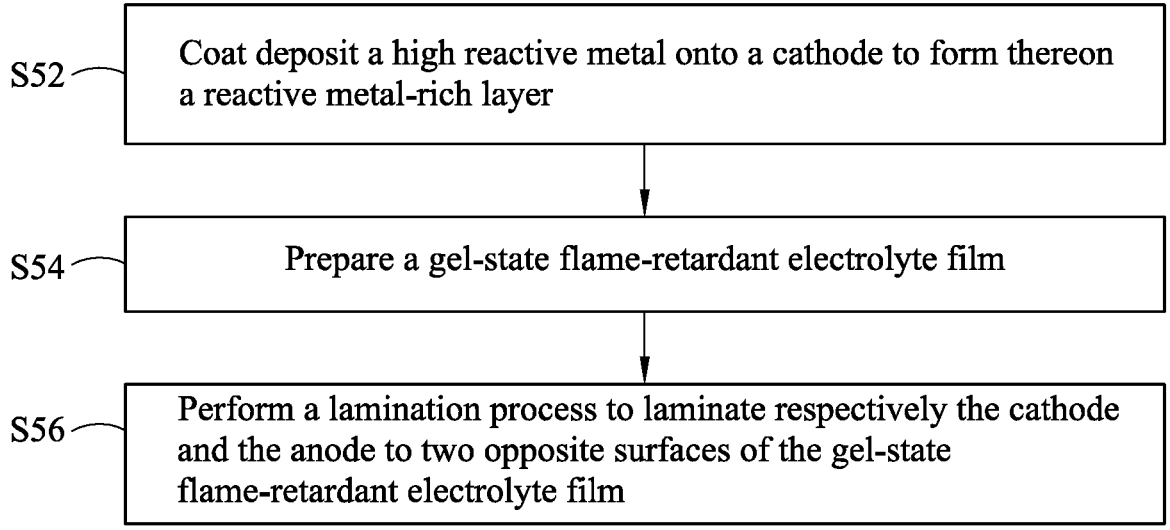
FIG. 1 is a flowchart of a preferred method for manufacturing a gel-state electrolyte battery in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
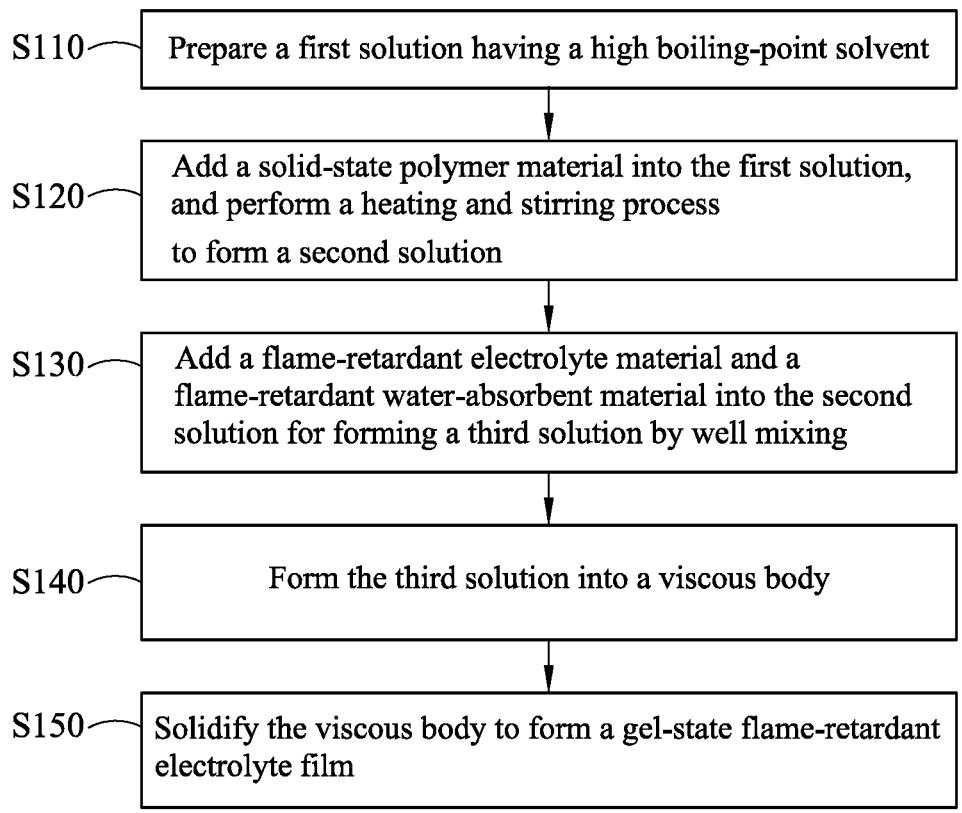
FIG. 2 is a flowchart of a preferred method for manufacturing a gel-state flame-retardant electrolyte film in accordance with this disclosure.
Figure 3:
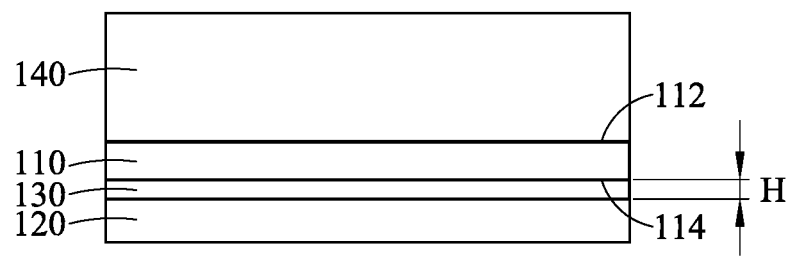
FIG. 3 is a schematic view of an embodiment of the gel-state electrolyte battery in accordance with this disclosure.

FIG. 1 is a flowchart of a preferred method for manufacturing a gel-state electrolyte battery in accordance with this disclosure. FIG. 2 is a flowchart of a preferred method for manufacturing a gel-state flame-retardant electrolyte film in accordance with this disclosure. FIG. 3 is a schematic view of an embodiment of the gel-state electrolyte battery in accordance with this disclosure.

Referring firstly to the embodiment shown in FIG. 1, the method for manufacturing a gel-state electrolyte battery S50 includes Step S52 to S56. While in performing Step S52, a high reactive metal is applied to form a reactive metal-rich layer 130, or the reactive metal-rich layer can be transferred into a reactive metal oxide-rich layer through oxidation (e.g. exposed in the air) as well (see FIG. 3) on a cathode 120 by coating (e.g. thermal evaporating or attaching). The reactive metal-rich layer 130 has a thickness H ranging from 50 nm to 20 µm. It shall be explained that the high reactive metal is a metal having larger chemical reactivity that aluminum does, such as lithium, rubidium, potassium, cesium, barium, strontium, calcium, sodium or magnesium. Since the reactive metal-rich layer 130 has a high reactive metal to react with the cathode or anode material, thus the reactive metal-rich layer 130, after the reaction, would contain more high reactive metal than the anode or cathode material has.

In one embodiment, the material for the cathode 120 can include an active substance and a conductive material, in which the active substance can be a high reactive metal, a high reactive metal alloy, a graphite, a graphene, a silicon, an activated carbon or a blend as mentioned above, and the conductive material can be a copper, an aluminum, a stainless steel, a graphite sheet, or any of a copper, an aluminum, a stainless steel, a graphite flake, a mica and a polymer material that is coated with a layer of a gold, a silver or a platinum. The coating as a protective layer has a thickness ranging from 30 nm to 5 µm. Similarly, the material for the anode 140 can include an active substance and a conductive material, in which the active substance can be a lithium cobaltate, a lithium nickelate, a lithium manganate, a lithium cobalt nickel manganate, a lithium nickel cobalt aluminate or a lithium iron phosphate, and the conductive material can be a copper, an aluminum, a stainless steel, a graphite sheet, or any of a copper, an aluminum stainless steel, a graphite flakes, a mica and a polymer surface that is coated by a gold, a silver or a platinum. The coating as a protective layer has a thickness ranging from 30 nm to 5 µm. In this disclosure, contents of the electrodes can be adjusted only according to practical needs, if and only if the active substances for the anode 140 or the cathode 120 can generate sufficient potential difference between the two active substances.

In this embodiment, wet coating, atmospheric plasma spraying, aerosol spraying or plasma sputtering can be applied to form the cathode 120 and the anode 140. The high reactive metal such as the lithium can form a lithium-rich layer on the cathode by coating (e.g. thermal evaporating or attaching) the lithium metal, or the lithium-rich layer can be transferred into the lithium-oxide-rich layer through oxidation (e.g. exposed in the air) as well. Similarly, another high reactive metal such as the sodium or magnesium can be used to form a sodium-rich layer, a magnesium-rich layer, a sodium-oxide-rich layer or a magnesium-oxide-rich layer.

Then, in performing Step S54, a gel-state flame-retardant electrolyte film 110 (see FIG. 3) is prepared. In detail, referring to FIG. 2, the method S100 for manufacturing the gel-state flame-retardant electrolyte film 110 includes Step S110 to Step S150. Firstly, in Step S110, a first solution having a high boiling-point solvent is prepared.

In one embodiment, a lithium-salt solid or solution can be used as the lithium-salt material. On the other hand, if the solvent with a boiling point over 200° C. at one atmospheric pressure is used as the high boiling-point solvent, then this high boiling-point solvent can dissolve a solid-state polymer material to form a second solution only at a temperature above 100° C. However, a low boiling-point co-solvent can be applied to dissolve the solid-state polymer material to form a pre-solution at a temperature lower than 100° C. In addition, the high boiling-point solvent can help metallic ions of the gel-state electrolyte to move between the anode and the cathode. In particular, the high boiling-point solvent can have 50~100 wt % sulfur-containing solvent who has a melting point over 25° C. and a boiling point over 250° C. at one atmospheric pressure. This high boiling-point solvent and the lithium-salt material can be heated and well mixed to form the first solution at a temperature ranging from 20° C. to 150° C.

Then, in performing Step S120, a solid-state polymer material is added into the first solution, and then a heating and stirring process is performed to form the second solution. In this embodiment, the solid-state polymer material is an organic material, and, after being heated and stirred, the second solution can be formed as a viscus body having the organic material. In this embodiment, the solid-state polymer material can be, but not limited to, polyethylene oxide (PEO), poly(propylene oxide) (PPO), polysiloxanes, polyacrylonitrile (PAN), poly(methyl methacrylate) (PMMA), poly(vinyl chloride) (PVC), poly(vinylidene fluoride) (PVDF) and poly(vinylidene fluoride-co-hexafluoropropylene) (PVDF-HFP).

In one embodiment, the Step S120 that the solid-state polymer material is added into the first solution and the heating and stirring process is performed to form the second solution, includes a step of: adopting a solvent having a boiling point below 100° C. at one atmospheric pressure to be a low boiling-point co-solvent. Then, the heating and stirring process is performed to well mix the solid-state polymer material and the low boiling-point co-solvent, so that a pre-solution having the low boiling-point co-solvent can be formed. Thereafter, the pre-solution is added into the first solution, and then these two solutions are well mixed to form the second solution. For example, in one embodiment, the solid-state polymer material can share 6~40 wt % of the second solution by having the weight of the solid-state polymer material equal to 20~60% the weight of the high boiling-point solvent, while the low boiling-point co-solvent shares 1~80 wt % of the second solution.

Then, in performing Step S130, a flame-retardant electrolyte material (i.e., a flame retardant with conductive ion materials) and a flame-retardant water-absorbent material (i.e., a water absorbent with flame-retardant materials) are added into the second solution so as to mix well a third solution. In detail, Step S130 further includes a step of: adopting a material able to increase electrolyte ion conductivity to be the flame-retardant electrolyte material. In other words, the flame-retardant electrolyte material can increase the electrolyte ion conductivity. In this embodiment, the flame-retardant electrolyte material can be silicon-containing oxide, lithium-containing sulfur oxide, lithium-containing sulfur tin oxide, lithium-containing sulfide, lithium-containing oxide, trimethyl phosphite (TMPI), trimethyl phosphate (TMP), core shell, lithium titanate ($Li_4Ti_5O_{12}$), a blend as mentioned above and so on. The flame-retardant electrolyte material has a grain size ranging from 10 nm to 1 µm. Then, adopt the flame-retardant 60% water-absorbent material having a water absorption greater than 0.1 g/g, and the flame-retardant water-absorbent material has a grain size ranging from 1 nm to 1 µm. According to this disclosure, the flame-retardant water-absorbent material is featured in absorbing water only but neither the high boiling-point solvent nor the low boiling-point co-solvent. In addition, in one embodiment, the flame-retardant electrolyte material is to share 1~90 wt % of the third solution, while the flame-retardant water-absorbent material shares 0.01~20 wt % of the third solution.

Then, in performing Step S140, a viscous matter is formed by the third solution. In detail, Step S140 includes a step of: heating and stirring the third solution to form the viscous matter having a viscosity greater than 200 cps above 25° C. The low boiling-point co-solvent can be applied to reduce a dissolution temperature of the solid-state polymer material for producing the aforesaid viscous matter. It shall be explained that the second solution is a viscous matter having organic material. Since the flame-retardant electrolyte material is an inorganic material, thus, after the heating and stirring process, the third solution would form a viscous matter having both the organic material and the inorganic material.

Then, in performing Step S150 (the forming step), the viscous matter is solidified so as to form a gel-state flame-retardant electrolyte film. In detail, in one embodiment, Step S150 includes the steps of: cooling down the viscous matter, removing the low boiling-point co-solvent, and forming, by solidification, the gel-state flame-retardant electrolyte film. As such, by applying the cooling process, the viscous matter can form the gel-state flame-retardant electrolyte film 110. In addition, the low boiling-point co-solvent can be evaporated into the atmosphere in room temperature. Thus, while in cooling the viscous matter, the low boiling-point co-solvent is evaporated into the air simultaneously. As shown in FIG. 3, the gel-state flame-retardant electrolyte film 110 is provided by the aforesaid manufacturing method S100.

In this disclosure, the means for solidifying the viscous matter is not specifically limited. In another embodiment, atmospheric plasma spraying or aerosol spraying can be also applied to a surface of the viscous matter, so that the gel-state flame-retardant electrolyte film 110 can be formed by solidification. Further, the viscous matter can be painted on an isolating film having a fair viscous affinity, or the viscous matter can be painted on an isolating film having a swelling property relevant to the viscous matter, or an isolating film can be dipped into the viscous matter. Then, the forming step S150 can be performed by adding a layer of the flame-retardant electrolyte powders.

Referring back to FIG. 1, after the gel-state flame-retardant electrolyte film 110 is formed in Step S54, Step S56 is performed to carry out a lamination process to laminate the cathode 120 and the anode 140 onto two opposite surfaces (i.e., the first surface 112 and the second surface 114) of the gel-state flame-retardant electrolyte film 110, respectively. Then, the reactive metal-rich layer 130 is sandwiched between the gel-state flame-retardant electrolyte film 110 and the cathode 120. In other words, the cathode material of the reactive metal-rich layer 130 can contain the conductive material, and can be laminated directly to the gel-state flame-retardant electrolyte film 110.

Nevertheless, this disclosure does not specifically limit the embodying thereof. In another embodiment, prior to Step S150 that the viscous matter is solidified to form the gel-state flame-retardant electrolyte film, a step of painting the viscous matter onto the reactive metal-rich layer 130 can be included. For example, the viscous matter can be painted onto the surface of the cathode material of the reactive metal-rich layer 130, in which the cathode material contains the conductive material. Then, another surface of the gel-state flame-retardant electrolyte film 110 or the viscous matter is laminated by the anode 140. Thus, after the viscous matter is formed, a gel-state electrolyte battery 100 including the gel-state flame-retardant electrolyte film 110 is produced.

FIG. 3 is a schematic view of an embodiment of the gel-state electrolyte battery in accordance with this disclosure. As shown, the gel-state electrolyte battery 100 is provided by the manufacturing method S50. The gel-state electrolyte battery 100 includes the gel-state flame-retardant electrolyte film 110, the cathode 120, the reactive metal-rich layer 130 and the anode 140. The anode 140 and the cathode 120 are laminated to the first surface 112 and the second surface 114 of the gel-state flame-retardant electrolyte film 110, respectively, in which the reactive metal-rich layer 130 is disposed between the gel-state flame-retardant electrolyte film 110 and the cathode 120.

Figure 4:
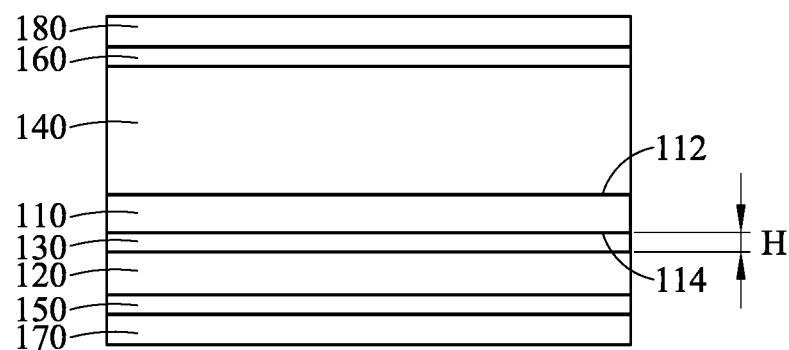
FIG. 4 is a schematic view of another embodiment of the gel-state electrolyte battery in accordance with this disclosure.

FIG. 4 is a schematic view of another embodiment of the gel-state electrolyte battery in accordance with this disclosure. As shown, it is noted that the gel-state electrolyte battery 200 of FIG. 4 is similar to the gel-state electrolyte battery 100 of FIG. 3, and thus the same elements of these two embodiments would be assigned with the same numbers. In addition, function for the same elements would be omitted herein. A major difference between the gel-state electrolyte battery 200 of FIG. 4 and the gel-state electrolyte battery 100 of FIG. 3 is that the gel-state electrolyte battery 200 of FIG. 4 further includes two collector layers 150, 160 and two substrates 170, 180. The substrate 170 or 180, made of an aluminum, a copper, a nickel, a mica flake or a polymer such as PET or PI, can be used as a support structure or a carrier of active substances. As shown, the collector layer 150 is disposed between the cathode 120 and the substrate 170, while the collector layer 160 is disposed between the anode 140 and the substrate 180. The collector layer 150, 160 can be made of a silver, a copper, a nickel, a cobalt, an aluminum, a stainless steel, a gold, a platinum or the like conductive material.

In summary, in the gel-state electrolyte battery, the gel-state flame-retardant electrolyte film and the manufacturing methods thereof provided by this disclosure, the gel-state flame-retardant electrolyte film contains the flame-retardant water-absorbent material for absorbing and restricting a tiny amount of water inside in the gel-state flame-retardant electrolyte film, the cathode or the anode. Since the water can reject the flame, thus frame retarding, before or after the water is absorbed, can be formed to enhance electrochemical efficiency of the gel-state electrolyte battery.

Further, in the methods for manufacturing the gel-state electrolyte battery and the gel-state flame-retardant electrolyte film, the low boiling-point co-solvent to help dissolution is introduced to reduce the process temperature for manufacturing the gel-state flame-retardant electrolyte film; for example, to reduce the process temperature to a temperature less than 100° C. or evenly equal to the room temperature.

In addition, the gel-state electrolyte battery of this disclosure contains a reactive metal-rich layer such as a lithium-rich layer, a sodium-rich layer or a magnesium-rich layer. By covering (e.g. thermal evaporating or attaching) the high reactive metal with high chemical reactivity, the high reactive metal would react with and then be discharged into the cathode or anode material, and thus the interfaces connecting the respective gel-state electrolytes to the cathode and the anode would be able to supply enough metal or metallic ions. Thereupon, possible concentration polarization occurring at the interfaces between the gel-state electrolyte and any of the cathode or anode material would be reduced, and the capacitance of the battery structure can be thus enhanced.

Furthermore, the gel-state flame-retardant electrolyte film of this disclosure can be provided with nano-projection surfaces, wettability, plasticity and flexibility, and thus good for well serving part of the battery.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A method for manufacturing a gel-state flame-retardant electrolyte film, comprising the steps of:
   (a) preparing a first solution having a high boiling-point solvent, wherein the high boiling-point solvent has a boiling point over 200° C. at one atmospheric pressure;
   (b) adding a solid-state polymer material into the first solution, and performing a heating and stirring process to form a second solution;
   (c) adding a flame-retardant electrolyte material and a flame-retardant water-absorbent material into the second solution for forming a third solution by well mixing;
   (d) forming the third solution into a viscous matter; and
   (e) solidifying the viscous matter to form the gel-state flame-retardant electrolyte film.

2. The method for manufacturing a gel-state flame-retardant electrolyte film of claim 1, wherein the step (a) includes the steps of:
   (a1) adopting a solvent having the boiling point over 200° C. at one atmospheric pressure as the high boiling-point solvent;
   (a2) adopting a lithium-salt solid or solution as a lithium-salt material; and
   (a3) heating and well mixing the high boiling-point solvent and the lithium-salt material at a temperature ranging from 20° C. to 150° C.

3. The method for manufacturing a gel-state flame-retardant electrolyte film of claim 1, wherein the step (b) includes a step of having the solid-state polymer material to share 6~40 wt % of the second solution and to have a weight equal to 20~60% weight of the high boiling-point solvent, a sulfur-containing high boiling-point solvent have a weight equal to 50%~100% weight of the high boiling-point solvent, the melting point of the sulfur-containing high boiling-point solvent under atmospheric pressure is greater than 25° C. and the boiling point is greater than 250° C.

4. The method for manufacturing a gel-state flame-retardant electrolyte film of claim 1, wherein the step (b) includes the steps of:
   (b1) adopting a solvent having a boiling temperature below 100° C. at one atmospheric pressure as a low boiling-point co-solvent;
   (b2) performing the heating and stirring process to well mix the solid-state polymer material and the low boiling-point co-solvent so as to form a pre-solution having the low boiling-point co-solvent; and
   (b3) adding the pre-solution into the first solution, and then well mixing the pre-solution and the first solution so as to form the second solution.

5. The method for manufacturing a gel-state flame-retardant electrolyte film of claim 4, wherein the step (b3) includes a step of having the solid-state polymer material to share 6~40 wt % of the second solution and to have a weight equal to 20~60% weight of the high boiling-point solvent, and having the low boiling-point co-solvent to share 1~80 wt % of the second solution, a sulfur-containing high boiling-point solvent has a weight equal to 50%~100% weight of the high boiling-point solvent, the melting point of the sulfur-containing high boiling-point solvent under one atmospheric pressure is greater than 25° C., and the boiling point thereof is greater than 250° C.

6. The method for manufacturing a gel-state flame-retardant electrolyte film of claim 1, wherein the step (c) includes the steps of:
   (c1) selecting the flame-retardant electrolyte material having a grain size ranging from 10 nm to 1 μm;
   (c2) selecting the flame-retardant water-absorbent material having a water absorption greater than 0.1 g/g and a grain size ranging from 1 nm to 1 μm; and
   (c3) having the flame-retardant electrolyte material to share 1~90 wt % of the third solution and the flame-retardant water-absorbent material to share 0.01~20 wt % of the third solution.

7. The method for manufacturing a gel-state flame-retardant electrolyte film of claim 1, wherein the step (d) includes a step of heating and stirring the third solution to form the viscous matter having a viscosity greater than 200 cps above 25° C.

8. The method for manufacturing a gel-state flame-retardant electrolyte film of claim 1, wherein the step (e) includes a step of cooling down the viscous matter and removing a low boiling-point co-solvent.

9. The method for manufacturing a gel-state flame-retardant electrolyte film of claim 1, wherein the step (e) includes a step of applying atmospheric plasma spraying or aerosol spraying to a surface of the viscous matter so as to form the gel-state flame-retardant electrolyte film by solidification.

10. A method for manufacturing a gel-state electrolyte battery, comprising the steps of:
    (1) coating a high reactive metal onto a cathode to form thereon a reactive metal-rich layer;
    (2) preparing a gel-state flame-retardant electrolyte film, wherein this step of preparing the gel-state flame-retardant electrolyte film includes the steps of:
    (21) preparing a first solution having a high boiling-point solvent, wherein the high boiling-point solvent has a boiling point over 200° C. at one atmospheric pressure;
    (22) adding a solid-state polymer material into the first solution, and performing a heating and stirring process to form a second solution;
    (23) adding a flame-retardant electrolyte material and a flame-retardant water-absorbent material into the second solution for forming a third solution by well mixing;
    (24) forming the third solution into a viscous matter; and
    (25) solidifying the viscous matter to form the gel-state flame-retardant electrolyte film; and
    (3) performing a lamination process to laminate respectively the cathode and an anode to two opposite surfaces of the gel-state flame-retardant electrolyte film, so that the reactive metal-rich layer is disposed between the gel-state flame-retardant electrolyte film and the cathode.

11. The method for manufacturing a gel-state electrolyte battery of claim 10, wherein, in the step (1), the high reactive metal includes a lithium, a sodium or a magnesium, and the reactive metal-rich layer is transferred into a reactive metal oxide-rich layer through oxidation.

12. The method for manufacturing a gel-state electrolyte battery of claim 10, prior to the step (25), further including a step of painting the viscous matter onto the reactive metal-rich layer.

13. The method for manufacturing a gel-state electrolyte battery of claim 10, wherein the step (21) includes the steps of:
    (211) adopting a solvent having the boiling point over 200° C. at one atmospheric pressure as the high boiling-point solvent;
    (212) adopting a lithium-salt solid or solution as a lithium-salt material; and (213) heating and well mixing the high boiling-point solvent and the lithium-salt material at a temperature ranging from 20° C. to 150° C.

14. The method for manufacturing a gel-state electrolyte battery of claim 10, wherein the step (22) includes a step of having the solid-state polymer material to share 6~40 wt % of the second solution and to have a weight equal to 20~60% weight of the high boiling-point solvent, a sulfur-containing high boiling-point solvent have a weight equal to 50%~100% weight of the high boiling-point solvent, the melting point of the sulfur-containing high boiling-point solvent under atmospheric pressure is greater than 25° C. and the boiling point thereof is greater than 250° C.

15. The method for manufacturing a gel-state electrolyte battery of claim 10, wherein the step (22) includes the steps of:
(221) adopting a solvent having a boiling temperature below 100° C. at one atmospheric pressure as a low boiling-point co-solvent;
(222) performing the heating and stirring process to well mix the solid-state polymer material and the low boiling-point co-solvent so as to form a pre-solution having the low boiling-point co-solvent; and
(223) adding the pre-solution into the first solution, and then well mixing the pre-solution and the first solution so as to form the second solution.

16. The method for manufacturing a gel-state electrolyte battery of claim 15, wherein the step (223) includes a step of having the solid-state polymer material to share 6~40 wt % of the second solution and to have a weight equal to 20~60% weight of the high boiling-point solvent, and having the low boiling-point co-solvent to share 1~80 wt % of the second solution.

17. The method for manufacturing a gel-state electrolyte battery of claim 10, wherein the step (23) includes the steps of:
(231) selecting the flame-retardant electrolyte material having a grain size ranging from 10 nm to 1 μm;
(232) selecting the flame-retardant water-absorbent material having a water absorption greater than 0.1 g/g and a grain size ranging from 1 nm to 1 μm; and
(233) having the flame-retardant electrolyte material to share 1~90 wt % of the third solution and the flame-retardant water-absorbent material to share 0.01~20 wt % of the third solution.

18. The method for manufacturing a gel-state electrolyte battery of claim 10, wherein the step (24) includes a step of heating and stirring the third solution to form the viscous matter having a viscosity greater than 200 cps above 25° C.

19. The method for manufacturing a gel-state electrolyte battery of claim 10, wherein the step (25) includes a step of cooling down the viscous matter and removing a low boiling-point co-solvent.

20. The method for manufacturing a gel-state electrolyte battery of claim 10, wherein the step (25) includes a step of applying atmospheric plasma spraying or aerosol spraying to a surface of the viscous matter so as to form the gel-state flame-retardant electrolyte film by solidification.

21. The method for manufacturing a gel-state electrolyte battery of claim 10, further including a step of applying wet coating, atmospheric plasma spraying, aerosol spraying or plasma sputtering to produce the cathode and the anode.

22. A gel-state electrolyte battery, manufactured by the method for manufacturing the gel-state electrolyte battery of claim 10, comprising:
the gel-state flame-retardant electrolyte film;
the cathode and the anode, laminated onto two opposite surfaces of the gel-state flame-retardant electrolyte film, respectively; and
the reactive metal-rich layer, disposed between the gel-state flame-retardant electrolyte film and the cathode.

\* \* \* \* \*